US012772137B2

(12) United States Patent
Koskinen et al.

(10) Patent No.: US 12,772,137 B2
(45) Date of Patent: Oct. 20, 2026

(54) CONDITIONAL CHANGE OF PRIMARY CELL OF SECONDARY CELL GROUP

(71) Applicant: Nokia Technologies Oy, Espoo (FI)

(72) Inventors: Henri Markus Koskinen, Espoo (FI); Krzysztof Kordybach, Wroclaw (PL); Ahmad Awada, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 360 days.

(21) Appl. No.: 18/553,438

(22) PCT Filed: Mar. 31, 2021

(86) PCT No.: PCT/EP2021/058419
§ 371 (c)(1),
(2) Date: Sep. 29, 2023

(87) PCT Pub. No.: WO2022/207091
PCT Pub. Date: Oct. 6, 2022

(65) Prior Publication Data
US 2024/0179606 A1 May 30, 2024

(51) Int. Cl.
*H04W 36/36* (2009.01)
*H04W 36/00* (2009.01)

(52) U.S. Cl.
CPC ..... *H04W 36/362* (2023.05); *H04W 36/0069* (2018.08); *H04W 36/008355* (2023.05); *H04W 36/36* (2013.01)

(58) Field of Classification Search
None
See application file for complete search history.

(56) References Cited

U.S. PATENT DOCUMENTS

2023/0232494 A1* 7/2023 Wang .................... H04W 76/15 370/329

OTHER PUBLICATIONS

3rd Generation Partnership Project, "Technical Specification Group Radio Access Network; Evolved Universal Terrestrial Radio Access (E-UTRA) and NR; Multi-connectivity; Stage 2 (Release 16)", Mar. 29, 2021, GPP TS 37.340, V.16.5.0, https://www.3gpp.org/ftp/Specs/archive/37_series/37.340/ (Year: 2021).*

* cited by examiner

*Primary Examiner* — Akwasi M Sarpong
*Assistant Examiner* — Gabrielle N Dai
(74) *Attorney, Agent, or Firm* — Barta Jones, PLLC

(57) ABSTRACT

There is provided an apparatus comprising at least one processor; and at least one memory including computer program code, the at least one memory and the computer program code configured to, with the at least one processor, cause the apparatus at least to perform: receiving, from a network node, configuration for a conditional change of primary cell of a secondary cell group; performing evaluation of one or more conditions for the conditional change; selecting a primary cell based on the evaluation; determining an activation status to be applied for a target secondary cell group associated with the selected primary cell based on at least one of the following: activation status of a source secondary cell group, the received configuration, pre-configuration; executing the conditional change to the selected primary cell; and applying the determined activation status for the target secondary cell group associated with the selected primary cell.

17 Claims, 9 Drawing Sheets

CONDITIONAL CHANGE OF PRIMARY CELL OF SECONDARY CELL GROUP

RELATED APPLICATION

This application was originally filed as PCT Application No. PCT/EP2021/058419, filed on Mar. 31, 2021, of which is incorporated herein by reference in its entirety.

FIELD

Various example embodiments relate to dual connectivity, more specifically to conditional change of primary cell of secondary cell group.

BACKGROUND

Dual connectivity (DC) allows a user equipment (UE) to simultaneously transmit and receive data on multiple component carriers from two serving nodes or cell groups. Conditional change of primary cell of secondary cell group is a procedure where the UE is configured to change the primary cell of a secondary cell group when a condition, also configured to the UE, is met.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus comprising at least one processor; and at least one memory including computer program code, the at least one memory and the computer program code configured to, with the at least one processor, cause the apparatus at least to perform: receiving, from a network node, configuration for a conditional change of primary cell of a secondary cell group; performing evaluation of one or more conditions for the conditional change; selecting a primary cell based on the evaluation; determining an activation status to be applied for a target secondary cell group associated with the selected primary cell based on at least one of the following: activation status of a source secondary cell group, the received configuration, pre-configuration; executing the conditional change to the selected primary cell; and applying the determined activation status for the target secondary cell group associated with the selected primary cell.

According to a second aspect, there is provided an apparatus comprising at least one processor; and at least one memory including computer program code, the at least one memory and the computer program code configured to, with the at least one processor, cause the apparatus at least to perform: transmitting, to a user equipment, UE, a configuration for a conditional change of primary cell of a secondary cell group, wherein the configuration causes the UE to determine an activation status based on at least one of an activation status of a source secondary cell group, the transmitted configuration, and pre-configuration, and wherein the configuration further causes the UE to apply the determined activation status for a target secondary cell group associated with a selected primary cell.

According to a third aspect, there is provided a method comprising: receiving, by a user equipment from a network node, configuration for a conditional change of primary cell of a secondary cell group; performing evaluation of one or more conditions for the conditional change; selecting a primary cell based on the evaluation; determining an activation status to be applied for a target secondary cell group associated with the selected primary cell based on at least one of the following: activation status of a source secondary cell group, the received configuration, pre-configuration; executing the conditional change to the selected primary cell; and applying the determined activation status for the target secondary cell group associated with the selected primary cell.

According to a fourth aspect, there is provided computer readable medium comprising program instructions that, when executed by at least one processor, cause a user equipment to at least perform: receiving, by the user equipment from a network node, configuration for a conditional change of primary cell of a secondary cell group; performing evaluation of one or more conditions for the conditional change; selecting a primary cell based on the evaluation; determining an activation status to be applied for a target secondary cell group associated with the selected primary cell based on at least one of the following: activation status of a source secondary cell group, the received configuration, pre-configuration; executing the conditional change to the selected primary cell; and applying the determined activation status for the target secondary cell group associated with the selected primary cell.

According to a further aspect, there is provided a method comprising transmitting, by a network node to a user equipment, UE, a configuration for a conditional change of primary cell of a secondary cell group, wherein the configuration causes the UE to determine an activation status based on at least one of an activation status of a source secondary cell group, the transmitted configuration, and pre-configuration, and wherein the configuration further causes the UE to apply the determined activation status for a target secondary cell group associated with a selected primary cell.

According to an embodiment, the configuration is transmitted as at least one radio resource control message.

According to an embodiment, the at least one radio resource control message is indicative of at least one of the following: a type of the conditional change of primary cell; an inheritance indication that causes the UE to determine the activation status of the source secondary cell group and apply the determined activation status of the source secondary cell group for the target secondary cell group; an activation status to be applied by the UE for the target secondary cell group.

According to a further aspect, there is provided a computer readable medium comprising program instructions that, when executed by at least one processor, cause a network node to at least perform transmitting, by the network node to a user equipment, UE, a configuration for a conditional change of primary cell of a secondary cell group, wherein the configuration causes the UE to determine an activation status based on at least one of an activation status of a source secondary cell group, the transmitted configuration, and pre-configuration, and wherein the configuration further causes the UE to apply the determined activation status for a target secondary cell group associated with a selected primary cell.

According to a further aspect, there is provided an apparatus comprising means for performing receiving, by a user equipment from a network node, configuration for a conditional change of primary cell of a secondary cell group; performing evaluation of one or more conditions for the conditional change; selecting a primary cell based on the evaluation; determining an activation status to be applied for a target secondary cell group associated with the selected primary cell based on at least one of the following: activation status of a source secondary cell group, the received configuration, pre-configuration; executing the conditional change to the selected primary cell; and applying the determined activation status for the target secondary cell group associated with the selected primary cell.

According to a further aspect, there is provided an apparatus comprising means for performing transmitting, by a network node to a user equipment, UE, a configuration for a conditional change of primary cell of a secondary cell group, wherein the configuration causes the UE to determine an activation status based on at least one of an activation status of a source secondary cell group, the transmitted configuration, and pre-configuration, and wherein the configuration further causes the UE to apply the determined activation status for a target secondary cell group associated with a selected primary cell.

DETAILED DESCRIPTION

Figure 1:
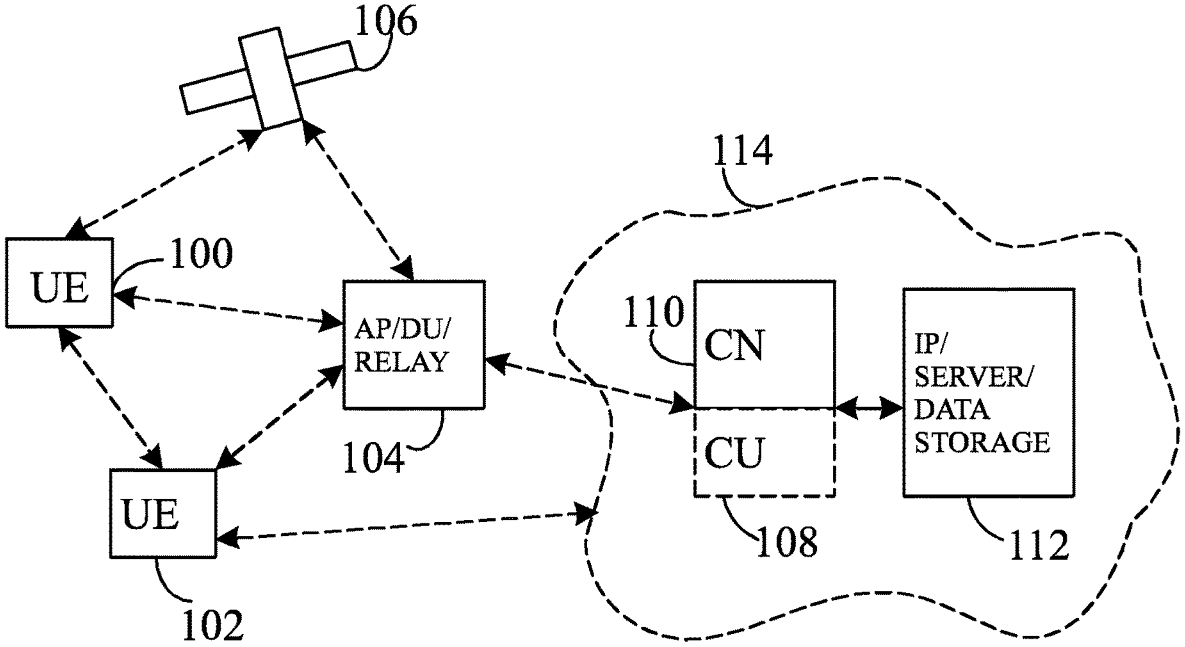
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices or user equipments (UE) 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the JAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

Additionally, although the apparatuses have been depicted as single entities, different units, processors and/or memory units (not all shown in FIG. 1) may be implemented inside these apparatuses, to enable the functioning thereof.

5G enables using multiple input—multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz—cmWave, below 7 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Each satellite 106 in the constellation may cover several satellite-enabled network entities that create on-ground cells. The on-ground cells may be created through an on-ground relay node 104 or by a gNB located on-ground or in a satellite.

Dual connectivity (DC) allows a user equipment (UE) to simultaneously transmit and receive data on multiple component carriers from two serving nodes or cell groups. Dual connectivity is allowed between two serving nodes operating in the same technology, or operating in different radio access technologies (RATs). A case wherein the nodes are operating in different radio access technologies may be referred to as Multi-RAT dual connectivity. Example configurations of multi-radio dual connectivity (MR-DC) include EN-DC (E-UTRA-NR Dual Connectivity), NR-DC (New Radio Dual Connectivity), NGEN-DC (NG-RAN-E-UTRA Dual Connectivity) and NE-DC (NR-E-UTRA Dual Connectivity).

Figure 2:
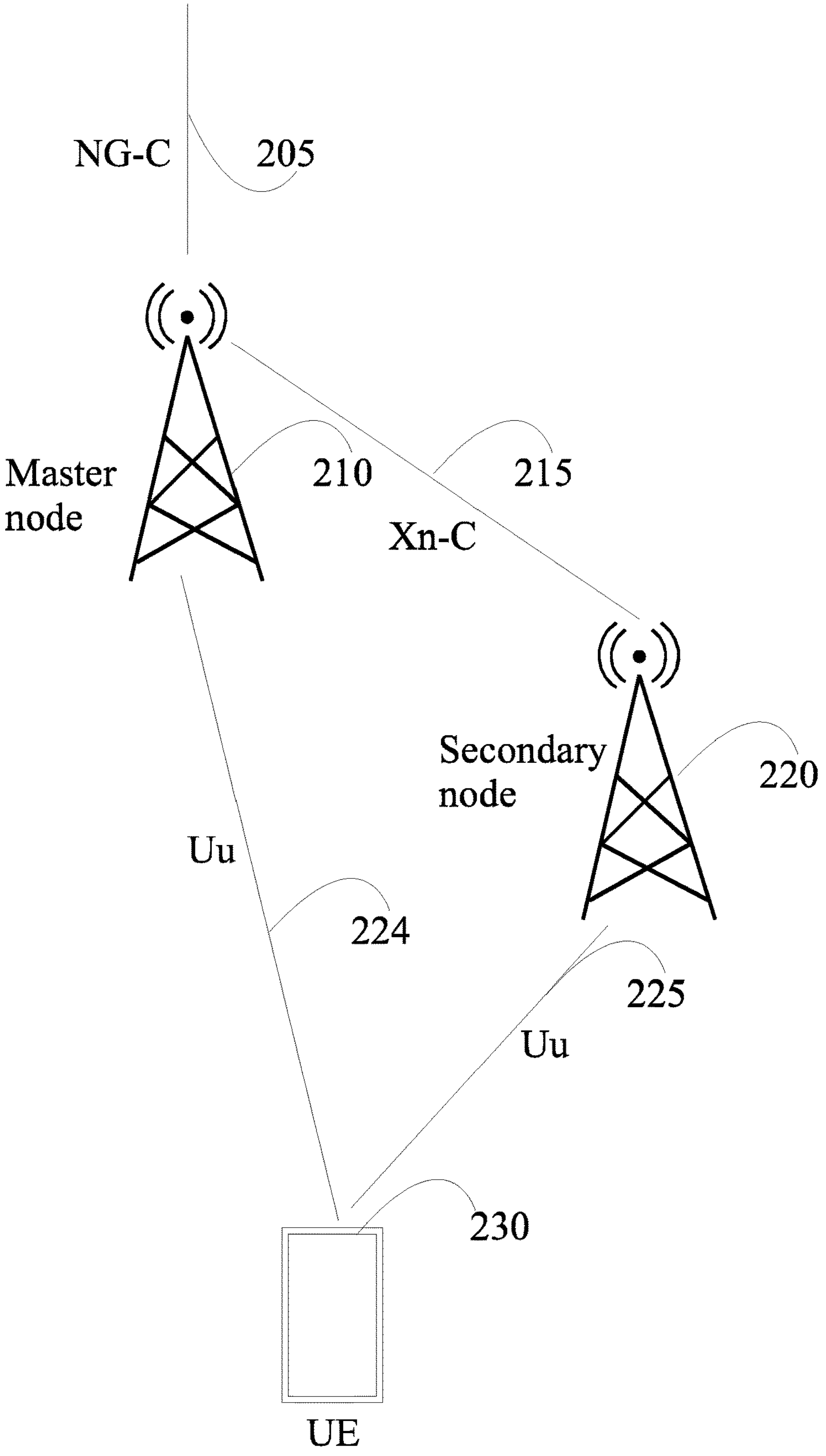
FIG. 2 shows, by way of example, a control plane architecture for multi-radio dual connectivity.

FIG. 2 shows, by way of example, a control plane architecture for MR-DC with 5G core (5GC). One node acts as a master node (MN) 210 and the other as a secondary node (SN) 220. The MN and SN are connected via a network interface 215, e.g. Xn-C, and the MN 210 is connected to the core network, e.g. via NG-C interface 205. For the purpose of MR-DC the SN 220 need not have a control plane connection to the core network. The SN 220 may provide additional resources to the UE 230. The UE may be connected to the MN 210 and the SN 220 via a network interface, such as Uu-interfaces 224, 225. Each radio node, e.g. the MN 210 and the SN 220, have their own radio resource control (RRC) entity, which may generate RRC protocol data units (PDUs) to be sent to the UE 230.

In MR-DC, a group of serving cells associated with a secondary node (SN) 220 is referred to as a secondary cell group (SCG). The SCG of a UE configured with dual connectivity comprises a primary cell (PSCell) and optionally one or more secondary cells (SCells).

A mobility procedure preconfigured to the UE that changes the UE's PSCell is referred to as a conditional PSCell change (CPC). The UE may execute the CPC once a predefined execution condition, e.g. defined in terms of measurement events, is fulfilled. For example, the UE may receive RRC reconfiguration message with CPC configuration, and start to evaluate the CPC execution conditions for candidate PSCell(s). If at least one CPC candidate PSCell satisfies the corresponding CPC execution condition, the UE completes the CPC execution procedure. The UE detaches from the source PSCell, applies the stored corresponding configuration and synchronises to the selected candidate PSCell, i.e. a target PSCell. Source PSCell is comprised in the source SCG controlled by a source SN. The target PSCell is comprised in the target SCG controlled by a target SN.

Type of the CPC may be either intra-SN CPC or inter-SN CPC. In intra-SN CPC, the SN configured to control a secondary cell group (SCG) of the UE stays the same. In other words, the source SN, or the SN controlling the source SCG, is the same as a target SN, i.e. the SN controlling the target SCG.

In inter-SN CPC, the SN controlling the SCG of the UE changes. In other words, the source SN, or the SN controlling the source SCG before the CPC execution is different than a target SN controlling the target SCG after the CPC execution.

Before and after the CPC execution, the SCG of the UE may be either in activated or deactivated state. In a deactivated state, the SCG is in a power-saving state, and the UE might not monitor physical downlink control channel (PDCCH) on any serving cell, which is part of the SCG. In other words, the UE might not receive or transmit any data over the SCG, when the SCG is in deactivated state. When the SCG is in deactivated state, the network and UE energy consumption are saved.

Before the CPC is executed, the source SN or MN may change the SCG activation status, which may be either activated or deactivated.

For example, let us consider that the UE assumes that the SCG is in activated state, and the target SN assumes that the SCG is in deactivated state. If a UE assumption of activated SCG is not matched on network side, the UE may use physical uplink control channel (PUCCH) resources that might not be configured to it and monitor PDCCH unnecessarily.

As another example, let us consider that the target SN assumes that the SCG is in activated state, and the UE assumes that the SCG is in deactivated state. If a target SN assumption of activated SCG is not matched on UE side, the target SN may schedule downlink user plane that is not received by the UE, since the UE does not monitor physical downlink control channel or physical downlink shared channel (PDCCH/PDSCH) when the SCG is in deactivated state. Then, the target SN may falsely conclude that the SCG radio link has failed.

Thus, it may be beneficial to ensure that the UE and the target SN would have the same and correct knowledge of the activation status of the SCG of the UE, once UE executes CPC.

Figure 3:
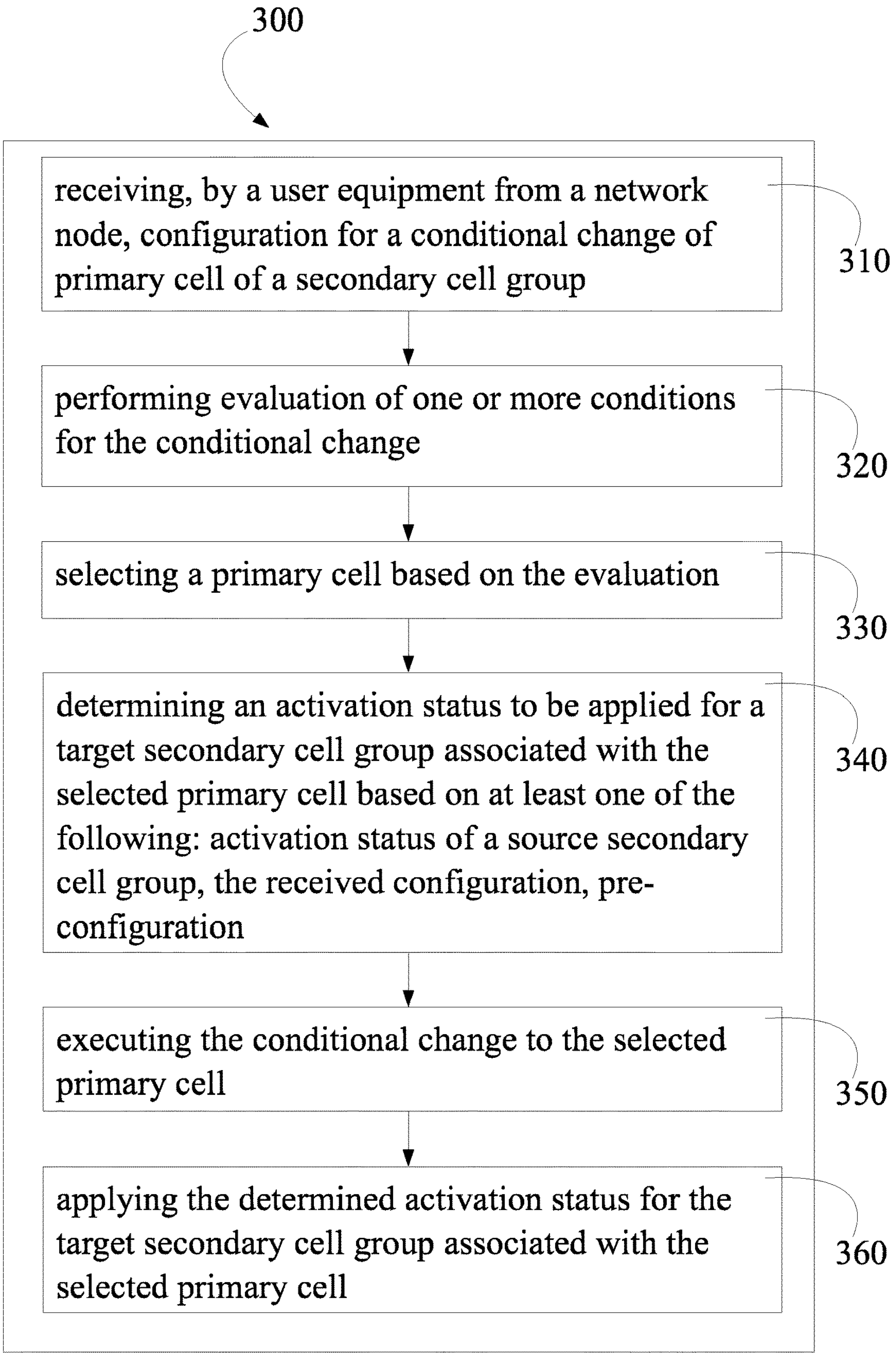
FIG. 3 shows, by way of example, a flowchart of a method.

FIG. 3 shows, by way of example, a flowchart of a method. The method 300 may be performed by a user equipment, such as UE 230 of FIG. 2, or in a control device configured to control the functioning thereof, when installed therein. The method 300 comprises receiving 310, by a user equipment from a network node, configuration for a conditional change of primary cell of a secondary cell group. The method 300 comprises performing 320 evaluation of one or more conditions for the conditional change. The method 300 comprises selecting 330 a primary cell based on the evaluation. The method 300 comprises determining 340 an activation status to be applied for a target secondary cell group associated with the selected primary cell based on at least one of the following: activation status of a source secondary cell group, the received configuration, pre-configuration. The method 300 comprises executing 350 the conditional change to the selected primary cell. The method 300 comprises applying 360 the determined activation status for the target secondary cell group associated with the selected primary cell.

The method as disclosed herein reduces signalling between entities, since a continuous synchronization of the activation status of the SCG might not be needed. The method as disclosed herein reduces signalling between entities, since a target SN does not need to confirm the activation status with the MN, for example, which may add delay to proper starting of SCG utilization in a case where it is supposed to be activated at the time of CPC execution. The method as disclosed herein allows flexible changing of the activation status of SCG without disrupting network services.

Figure 4A:
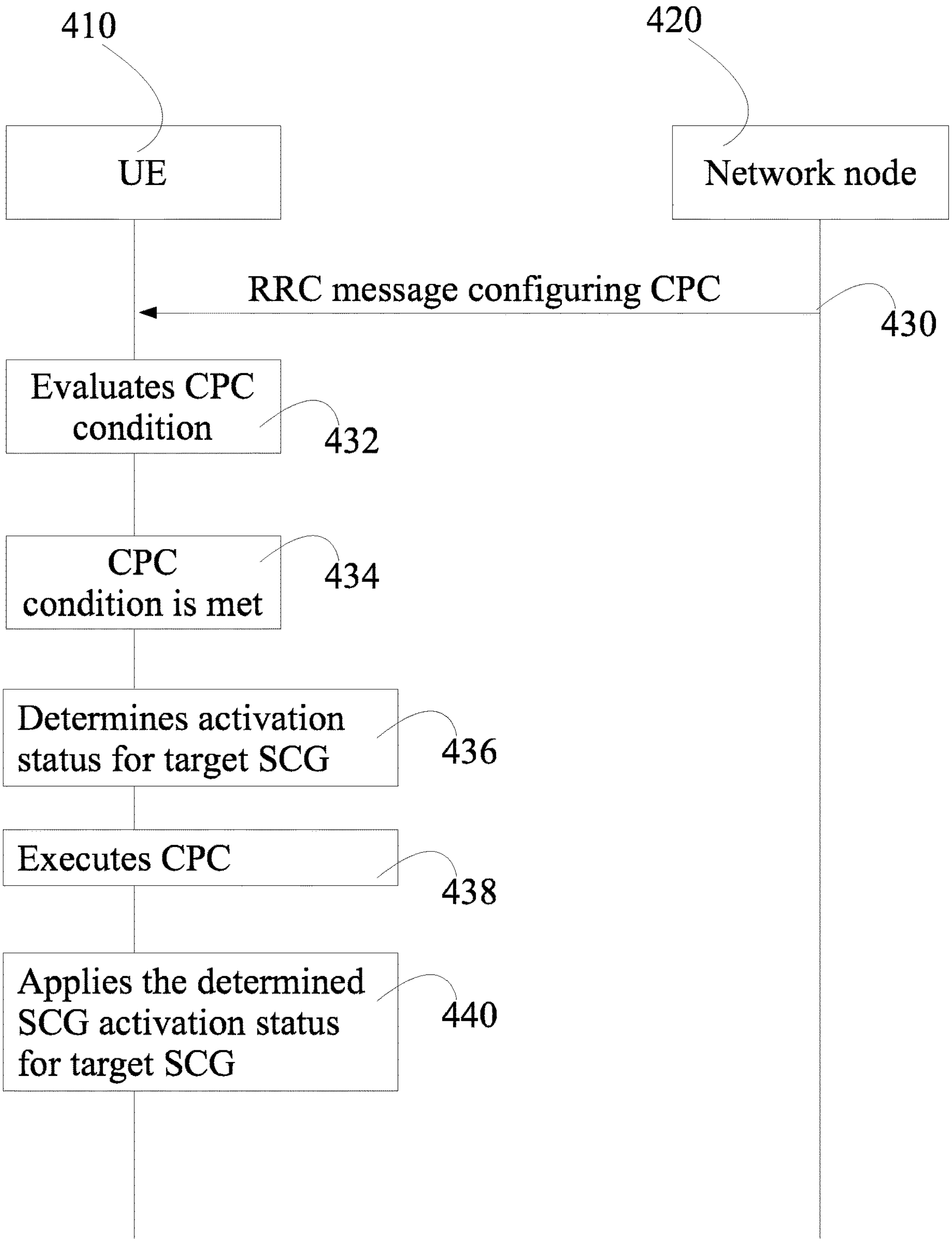
FIG. 4*a* shows, by way of example, signalling between a user equipment and a network node.

FIG. 4*a* shows, by way of example, signalling between a user equipment (UE) 410 and a network node 420. The network node may be e.g. a master node (MN) or a source secondary node (SN).

The UE receives 430 configuration for a conditional PSCell change (CPC). The configuration from the network node may be received as a radio resource control (RRC) message. The configuration comprises at least one or more conditions for the CPC.

When the type of CPC is intra-SN CPC, the configuration message may be generated by and received from a source SN. For example, the configuration may be sent over signalling radio bearer 3 (SRB3) using source SN radio link or signalling radio bearer 1 (SRB1).

In case of inter-SN CPC, the configuration may be generated by and received from the MN. For example, the configuration may be sent over SRB1.

UE evaluates 432 the condition(s) for the CPC, and based on the evaluation, selects a primary cell in a target SCG. At least one CPC candidate PSCell has satisfied the corresponding CPC execution condition, that is, the CPC condition is met 434.

UE determines 436 an activation status to be applied for a target SCG associated with the selected primary cell. UE may perform the determination of the activation status based on at least one of the following: activation status of a source SCG, the received configuration, pre-configuration. The activation status may be activated or deactivated.

Upon execution 438 of the CPC to the PSCell in the target SCG, the UE applies 440 the determined activation status for the target SCG associated with the selected PSCell. Thus, if the applied activation status for the target SCG is deactivated, after completion of the CPC the UE does not monitor PDCCH on any serving cell part of the target SCG, and will not receive or transmit any data over the target SCG. If the applied activation status for the target SCG is activated, the UE may monitor PDCCH, for example.

The configuration from the network node may be received as a radio resource control (RRC) message. For example, the received configuration may indicate the activation status to be applied for the target SCG.

As another example, the received configuration may comprise an inheritance indication. The UE may, based on the inheritance indication, determine the activation status of the source SCG and apply the inherited activation status for the target SCG.

The RRC message received 430 from the network node 420 may comprise an indication of a type of the CPC, i.e. whether an intra-SN CPC or inter-SN CPC is to be executed.

Figure 4B:
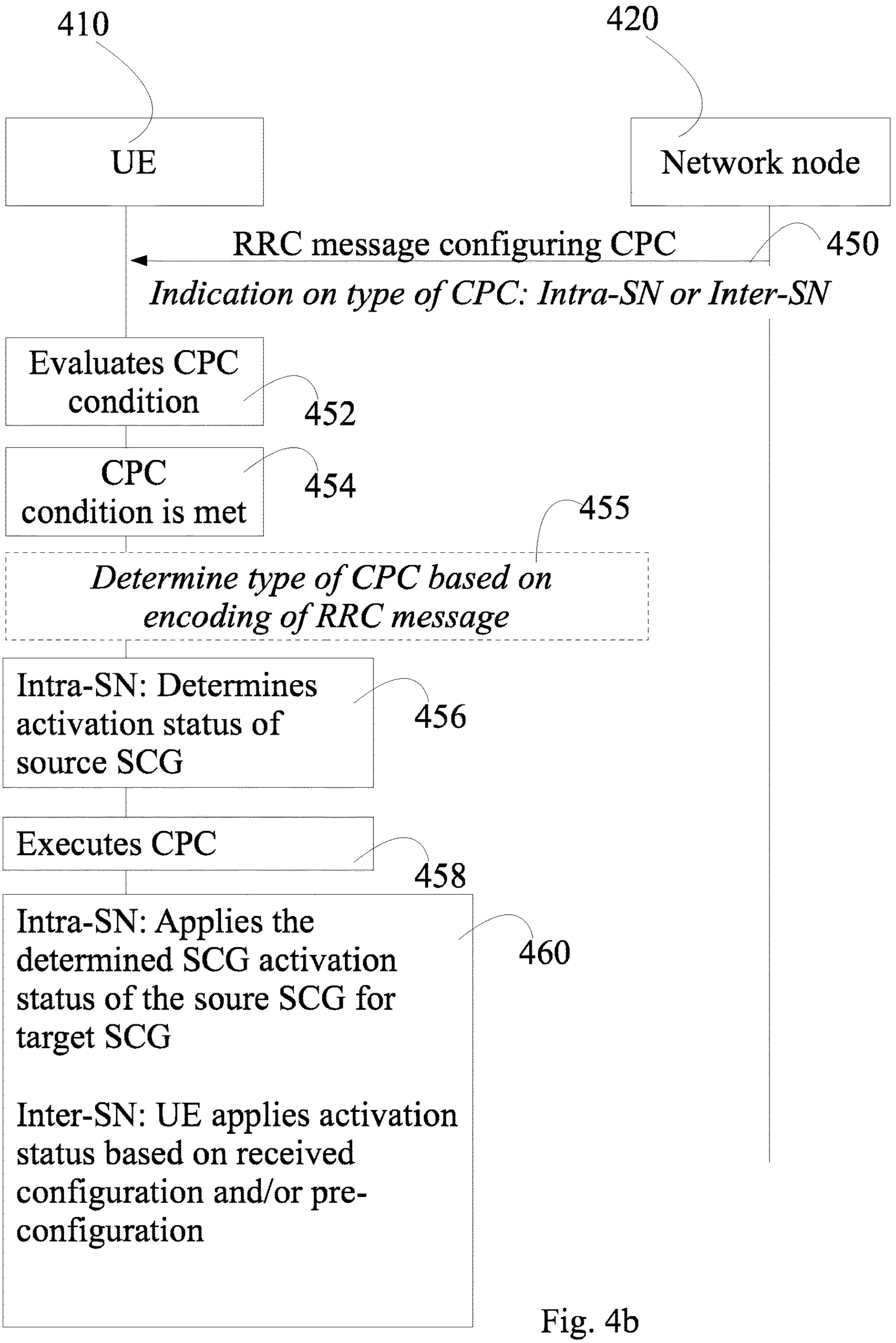
FIG. 4*b* shows, by way of example, signalling between a user equipment and a network node.

FIG. 4*b* shows, by way of example, signalling between a user equipment (UE) 410 and a network node 420. The UE receives 450 configuration for a conditional PSCell change (CPC). The configuration from the network node may be received as a radio resource control (RRC) message. The configuration comprises at least one or more conditions for the CPC.

UE evaluates 452 the condition(s) for the CPC, and based on the evaluation, selects a primary cell in a target SCG. At least one CPC candidate PSCell has satisfied the corresponding CPC execution condition, that is, the CPC condition is met 454.

The UE may determine the type of the CPC based on the received configuration. For example, the RRC message received 450 from the network node 420 may comprise an indication of a type of the CPC, i.e. whether an intra-SN CPC or inter-SN CPC is to be executed. The indication of the type of the CPC may be comprised in the RRC message as a type indicator.

As another example, the UE may determine 455 whether the type is intra-SN or inter-SN based on encoding of the RRC message, or structure of the RRC message, comprising the CPC configuration. In intra-SN CPC, the CPC condition may be part of the CPC configuration that is prepared by the source SN. In inter-SN CPC, the CPC condition is included by MN in the RRC reconfiguration which includes the CPC configuration that may be fetched from the prepared target SN. In this case, the CPC condition is outside of the CPC configuration that is prepared by the target SN. When or before the CPC condition is met 454, the UE may decode the corresponding CPC configuration and will know the type of the CPC by checking the indication provided by the network in the RRC message, or from the encoding of the CPC conditions in the RRC reconfiguration message.

Let us consider that the type of CPC is the intra-SN CPC, that is, the source SCG and the target SCG are controlled by the same SN. In this case, the UE 410 determines 456 activation status of the source SCG to be applied for the target SCG. The activation status may be activated or deactivated. The UE is considered to be aware of the activation status of the current SCG, that is, the source SCG. For example, if the activation status of the SCG is changed to deactivated state, the network node may indicate this change to the UE, e.g. by RRC reconfiguration message.

Upon execution 458 of the CPC to the PSCell in the target SCG, the UE applies 460 the determined activation status of the source SCG for the target SCG.

This kind of inheritance of the activation status of the source SCG enables both the UE and the target SN to be aware of the activation status of the target SCG at the time of CPC execution. In intra-SN CPC, the target SN is aware of the activation status of the source SCG, since the SN stays the same.

If the type of CPC is inter-SN CPC, the UE may determine the activation status based on the received configuration and/or the pre-configuration. For example, the received configuration may indicate the activation status to be applied for the target SCG, or the activation status to be applied may be pre-configured (e.g. by a network entity, such as the network node, or the UE may be pre-configured via one or more settings of the UE). For example, if the activation status has been pre-configured, the UE may assume that the target SCG is in activated state. This scenario has been described in the context of FIG. 5.

Figure 4C:
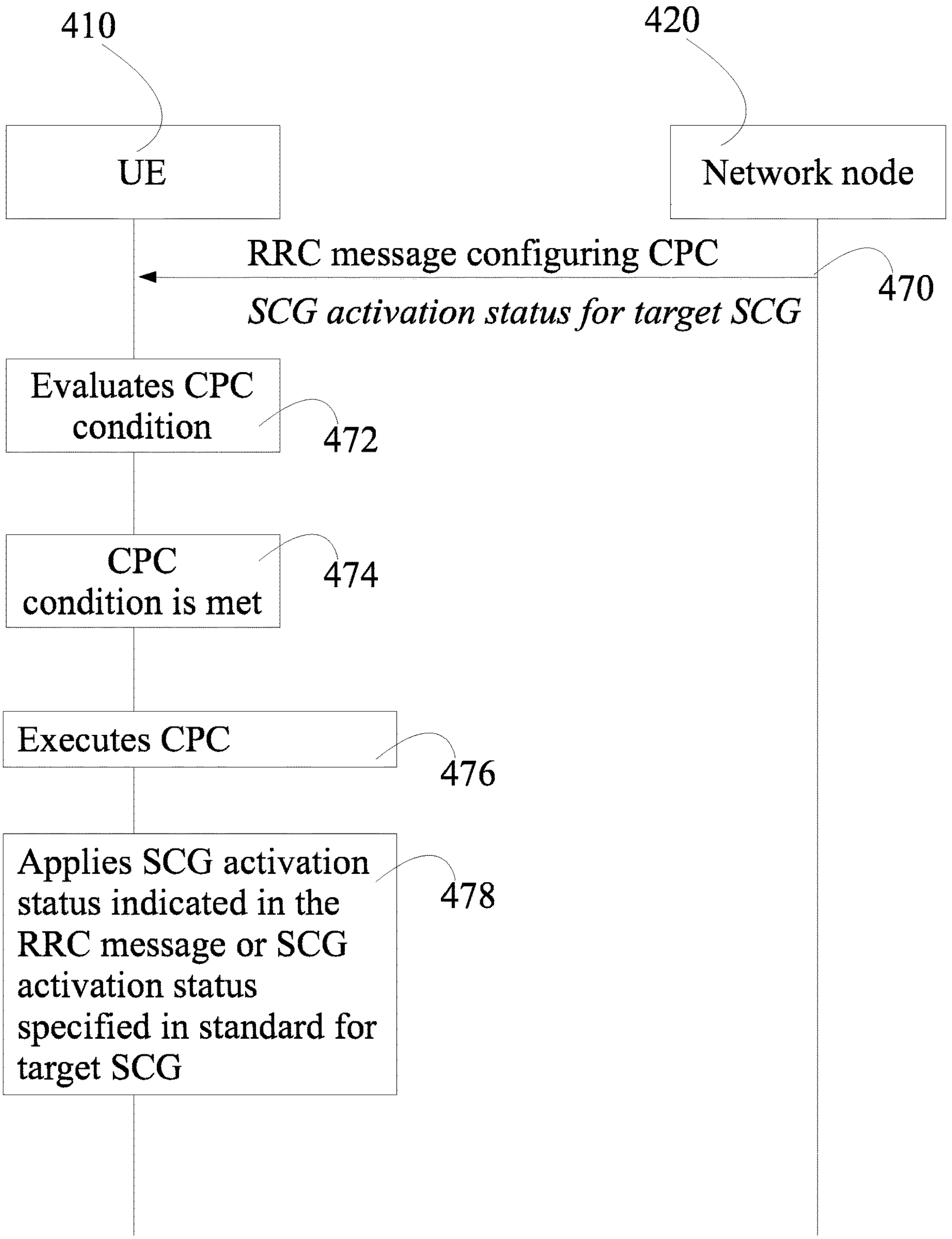
FIG. 4*c* shows, by way of example, signalling between a user equipment and a network node.

FIG. 4*c* shows, by way of example, signalling between a user equipment (UE) 410 and a network node 420. The UE receives 470 configuration for a conditional PSCell change (CPC). The configuration from the network node may be received as a radio resource control (RRC) message. The configuration comprises at least one or more conditions for the CPC.

UE evaluates 472 the condition(s) for the CPC, and based on the evaluation, selects a primary cell in a target SCG. At least one CPC candidate PSCell has satisfied the corresponding CPC execution condition, that is, the CPC condition is met 474.

It may be, e.g. in case of inter-SN CPC, that the UE cannot determine that the activation status of the source SCG is inherited to be applied for the target SCG at CPC execution. Then, the activation status of the target SN may be determined independently of the activation status of the source SCG. For example, the received 470 configuration may comprise an indication of the SCG activation status to be applied for the target SCG at the time of CPC execution. As another example, the activation status to be applied for the target SCG at the time of CPC execution may be specified in a standard.

Thus, upon execution 476 of the CPC, the UE may apply 478 the activation status as indicated in the received 470 configuration or the activation status as specified in a standard for the target SCG.

Figure 5:
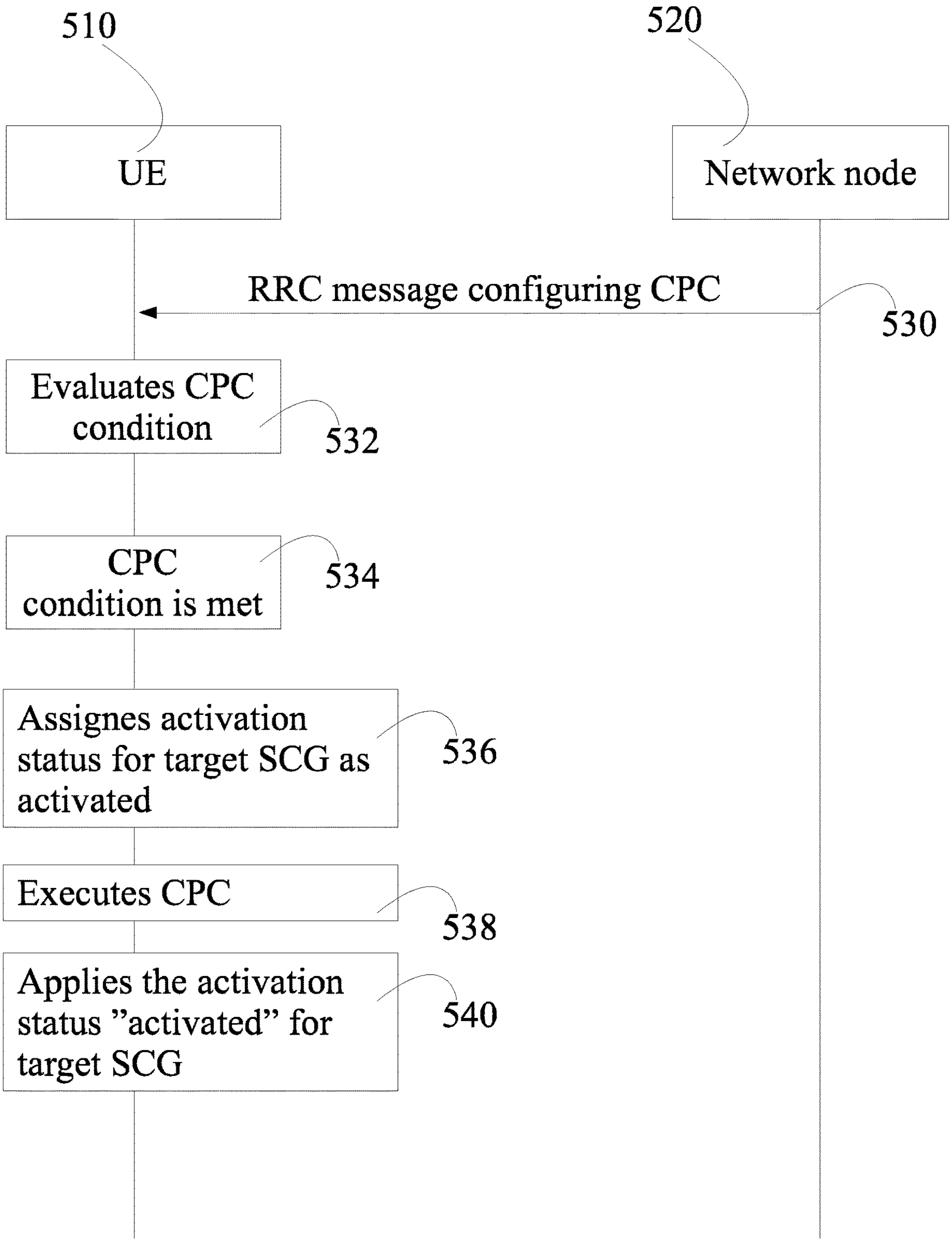
FIG. 5 shows, by way of example, signalling between a user equipment and a network node.

FIG. 5 shows, by way of example, signalling between a user equipment (UE) 510 and a network node 520. Let us consider that the type of CPC is the inter-SN CPC. The UE receives 530 configuration for a conditional PSCell change (CPC). The configuration from the network node may be received as a radio resource control (RRC) message.

UE evaluates 532 the condition(s) for the CPC, and based on the evaluation, selects a primary cell in a target SCG. At least one CPC candidate PSCell has satisfied the corresponding CPC execution condition, that is, the CPC condition is met 534.

The type of CPC is the inter-SN CPC in the example of FIG. 5. For example, the type of the CPC as indicated in the RRC message received 530 from the network node 520 is inter-SN CPC. As another example, the UE may determine that the type of the CPC is inter-SN CPC based on encoding of the RRC message, as described above.

In case of inter-SN CPC, the activation status for the target SCG is assigned or determined 536 as activated. The activation status may be indicated in a pre-configuration.

Upon execution 538 of the CPC to the PSCell in the target SCG, the UE applies 540 activation status "activated" for the target SCG. The target SN may receive the information of the activation status for the target SCG based on negotiations with other node(s) when the CPC is prepared on the network side, for example. As another example, the activation status for the target SCG may be fixed in a standard.

Figure 6:
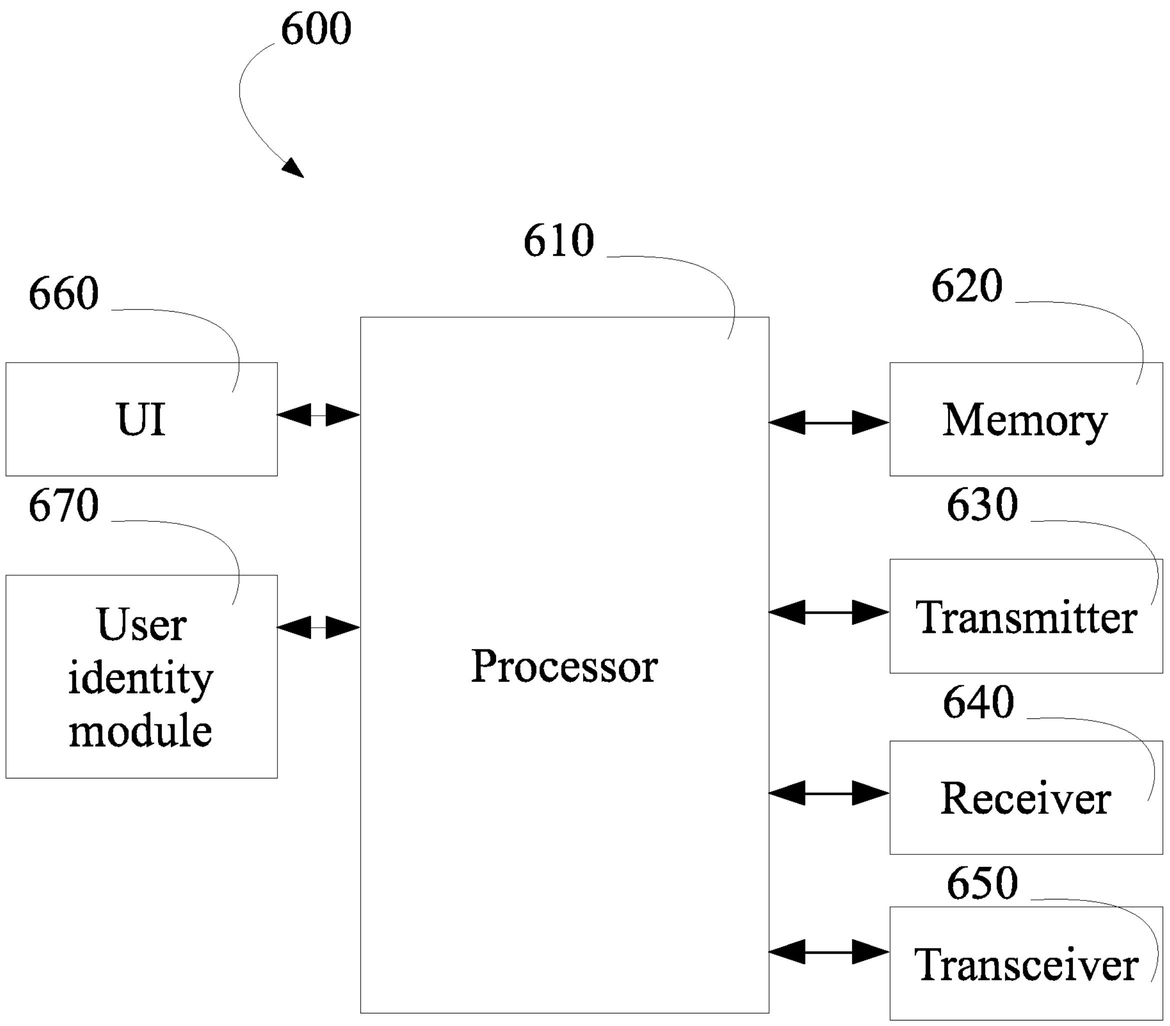
FIG. 6 shows, by way of example, a block diagram of an apparatus.

FIG. 6 shows, by way of example, a block diagram of an apparatus capable of performing the method as disclosed herein. Illustrated is device 600, which may comprise, for example, a mobile communication device such as mobile 230 of FIG. 2, or UE 410 of FIG. 4*a*, or a network node 420 of FIG. 4*a*. Comprised in device 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may be a control device. A processing core may comprise, for example, a Cortex-A8 processing core manufactured by ARM Holdings or a Steamroller processing core designed by Advanced Micro Devices Corporation. Processor 610 may comprise at least one Qualcomm Snapdragon and/or Intel Atom processor. Processor 610 may comprise at least one application-specific integrated circuit, ASIC. Processor 610 may comprise at least one field-programmable gate array, FPGA. Processor 610 may be means for performing method steps in device 300. Processor 610 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or a network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part external to device 600 but accessible to device 600.

Device 600 may comprise a transmitter 630. Device 600 may comprise a receiver 640. Transmitter 630 and receiver 640 may be configured to transmit and receive, respectively, information in accordance with at least one cellular or non-cellular standard. Transmitter 630 may comprise more than one transmitter. Receiver 640 may comprise more than one receiver. Transmitter 630 and/or receiver 640 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 600 may comprise a near-field communication, NFC, transceiver 650. NFC transceiver 650 may support at least one NFC technology, such as NFC, Bluetooth, Wibree or similar technologies.

Device 600 may comprise user interface, UI, 660. UI 660 may comprise at least one of a display, a keyboard, a touchscreen, a vibrator arranged to signal to a user by causing device 600 to vibrate, a speaker and a microphone. A user may be able to operate device 600 via UI 660, for example to accept incoming telephone calls, to originate telephone calls or video calls, to browse the Internet, to manage digital files stored in memory 620 or on a cloud accessible via transmitter 630 and receiver 640, or via NFC transceiver 650, and/or to play games.

Device 600 may comprise or be arranged to accept a user identity module 670. User identity module 670 may comprise, for example, a subscriber identity module, SIM, card installable in device 600. A user identity module 670 may comprise information identifying a subscription of a user of device 600. A user identity module 670 may comprise cryptographic information usable to verify the identity of a user of device 600 and/or to facilitate encryption of communicated information and billing of the user of device 600 for communication effected via device 600.

Processor 610 may be furnished with a transmitter arranged to output information from processor 610, via electrical leads internal to device 600, to other devices comprised in device 600. Such a transmitter may comprise a serial bus transmitter arranged to, for example, output information via at least one electrical lead to memory 620 for storage therein. Alternatively to a serial bus, the transmitter may comprise a parallel bus transmitter. Likewise processor 610 may comprise a receiver arranged to receive information in processor 610, via electrical leads internal to device 600, from other devices comprised in device 600. Such a receiver may comprise a serial bus receiver arranged to, for example, receive information via at least one electrical lead from receiver 640 for processing in processor 610. Alternatively to a serial bus, the receiver may comprise a parallel bus receiver.

Device 600 may comprise further devices not illustrated in FIG. 6. For example, where device 600 comprises a smartphone, it may comprise at least one digital camera. Some devices 600 may comprise a back-facing camera and a front-facing camera, wherein the back-facing camera may be intended for digital photography and the front-facing camera for video telephony. Device 600 may comprise a fingerprint sensor arranged to authenticate, at least in part, a user of device 600. In some example embodiments, device 600 lacks at least one device described above. For example, some devices 600 may lack a NFC transceiver 650 and/or user identity module 670.

Figure 7:
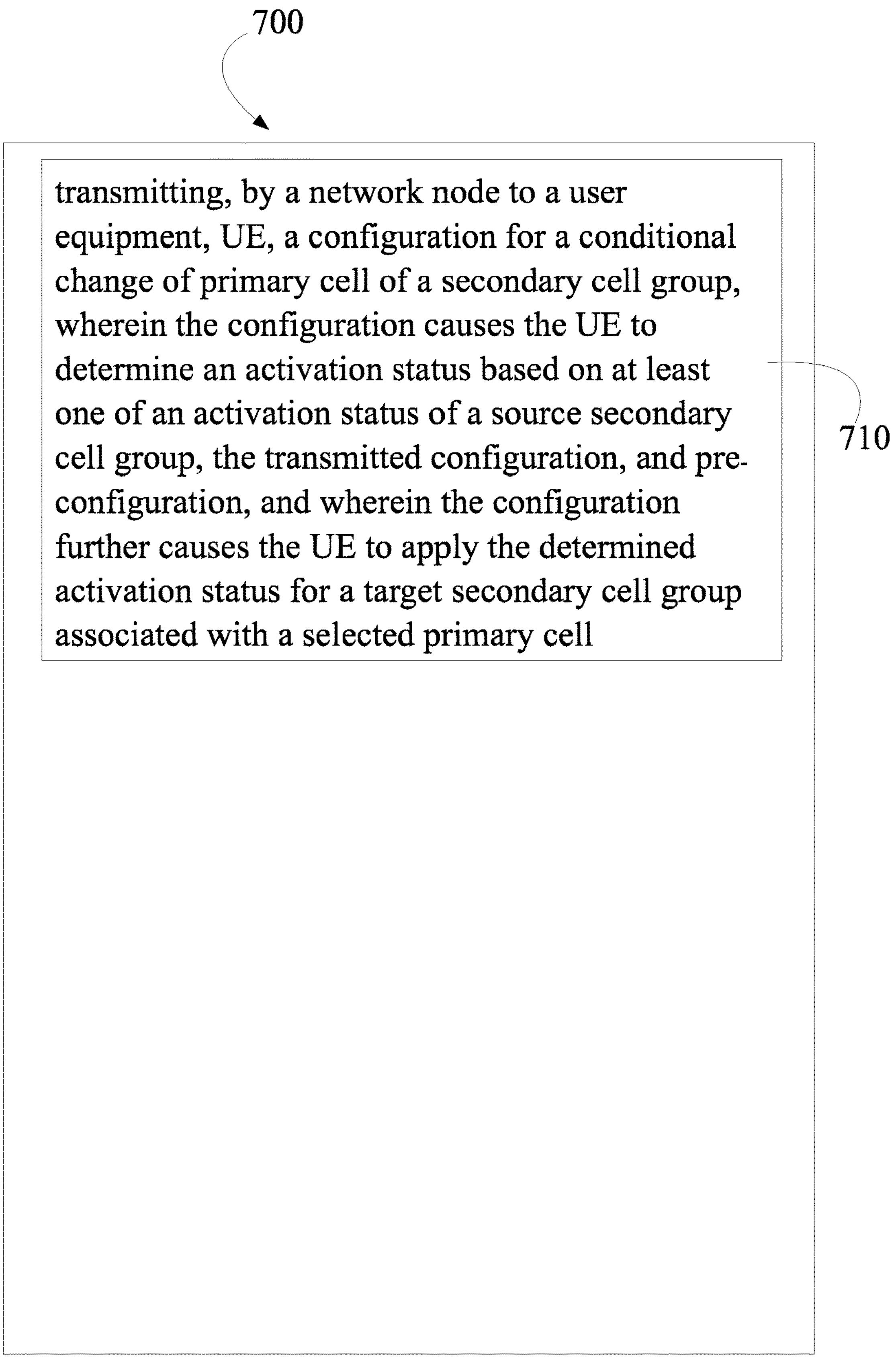
FIG. 7 shows, by way of example, a flowchart of a method.

FIG. 7 shows, by way of example, a flowchart of a method. The method 700 may be performed by a network node, such as a network node 420 of FIG. 2, or in a control device configured to control the functioning thereof, when installed therein. The network node may be a secondary node or a master node. The method 700 comprises transmitting 710, by a network node to a user equipment, UE, a configuration for a conditional change of primary cell of a secondary cell group, wherein the configuration causes the UE to determine an activation status based on at least one of an activation status of a source secondary cell group, the transmitted configuration, and pre-configuration, and wherein the configuration further causes the UE to apply the determined activation status for a target secondary cell group associated with a selected primary cell.

What is claimed is:

1. An apparatus comprising:

at least one processor; and at least one memory including computer program code, the at least one memory and the computer program code configured to, with the at least one processor, cause the apparatus at least to perform:

receiving, from a network node, configuration for a conditional change of primary cell of a secondary cell group, wherein the configuration indicates whether the conditional change is an intra-secondary-node conditional change or an inter-secondary-node conditional change;

performing evaluation of one or more conditions for the conditional change;

selecting a primary cell based on the evaluation;

determining an activation status to be applied for a target secondary cell group associated with the selected primary cell at a time of execution of the conditional change based on the following: activation status of a source secondary cell group, the received configuration, and pre-configuration, wherein:

when the conditional change is the intra-secondary-node conditional change, the determining comprises inheriting the activation status of the source secondary cell group; and when the conditional change is the inter-secondary-node conditional change, the determining comprises determining the activation status based on the received configuration or the pre-configuration independently of the activation status of the source secondary cell group;

executing the conditional change to the selected primary cell; and applying the determined activation status for the target secondary cell group associated with the selected primary cell immediately upon execution of the conditional change without receiving a confirmation of the activation status from the network node.

2. The apparatus of claim 1, wherein the activation status is activated or deactivated.

3. The apparatus of claim 2, wherein the configuration is received as at least one radio resource control message.

4. The apparatus of claim 3, wherein the determining of the activation status comprises inheriting the activation status of the source secondary cell group only when the conditional change is an intra-secondary-node conditional change, and refraining from inheriting the activation status when the conditional change is an inter-secondary-node conditional change.

5. The apparatus of claim 4, wherein, when the conditional change is the inter-secondary-node conditional change and the received configuration does not explicitly indicate an activation status, the apparatus is caused to determine the activation status based on a pre-configuration that assumes the target secondary cell group is activated.

6. The apparatus of claim 5, wherein the apparatus is further caused to apply the determined activation status for the target secondary cell group before monitoring a physical downlink control channel on any serving cell of the target secondary cell group.

7. The apparatus of claim 6, wherein the configuration comprises an inheritance indication, and wherein the apparatus is caused to interpret the inheritance indication to require application of the activation status of the source secondary cell group to the target secondary cell group without network confirmation at execution of the conditional change.

8. The apparatus of claim 7, wherein the apparatus is further caused to determine the type of the conditional change by evaluating whether conditional change conditions are encoded inside or outside a conditional primary cell change configuration portion of a radio resource control message.

9. The apparatus of claim 8, wherein the received configuration comprises an inheritance indication, wherein the apparatus is further caused to perform:

based on the inheritance indication, determining the activation status of the source secondary cell group and applying the determined activation status of the source secondary cell group for the target secondary cell group.

10. The apparatus of claim 9, wherein the received configuration indicates an activation status, wherein the apparatus is further caused to perform: applying the indicated activation status for the target secondary cell group.

11. A method performed by a user equipment, the method comprising:

receiving, from a network node, configuration for a conditional change of primary cell of a secondary cell group, wherein the configuration indicates whether the conditional change is an intra-secondary-node conditional change or an inter-secondary-node conditional change;

performing evaluation of one or more conditions for the conditional change;

selecting a primary cell based on the evaluation;

determining an activation status to be applied for a target secondary cell group associated with the selected primary cell at a time of execution of the conditional change based on the following: activation status of a source secondary cell group, the received configuration, and pre-configuration, wherein:

when the conditional change is the intra-secondary-node conditional change, the determining comprises inheriting the activation status of the source secondary cell group; and when the conditional change is the inter-secondary-node conditional change, the determining comprises determining the activation status based on the received configuration or the pre-configuration independently of the activation status of the source secondary cell group;

executing the conditional change to the selected primary cell; and applying the determined activation status for the target secondary cell group associated with the selected primary cell immediately upon execution of the conditional change without receiving a confirmation of the activation status from the network node.

12. The method of claim 11, wherein the activation status is activated or deactivated.

13. The method of claim 12, wherein the configuration is received as at least one radio resource control message.

14. The method of claim 11, wherein the determining of the activation status comprises inheriting the activation status of the source secondary cell group only when the conditional change is an intra-secondary-node conditional change, and refraining from inheriting the activation status when the conditional change is an inter-secondary-node conditional change.

15. The method of claim 11, wherein, when the conditional change is the inter-secondary-node conditional change and the received configuration does not explicitly indicate an activation status, the apparatus is caused to determine the activation status based on a pre-configuration that assumes the target secondary cell group is activated.

16. The method of claim 15, further comprising applying the determined activation status for the target secondary cell group before monitoring a physical downlink control channel on any serving cell of the target secondary cell group.

17. The method of claim 11, wherein the configuration comprises an inheritance indication, and wherein the apparatus is caused to interpret the inheritance indication to require application of the activation status of the source secondary cell group to the target secondary cell group without network confirmation at execution of the conditional change.

* * * * *